W. COLVIN.
COLLAPSIBLE AUTOMOBILE FENDER.
APPLICATION FILED JULY 29, 1916.
1,241,709.
Patented Oct. 2, 1917.
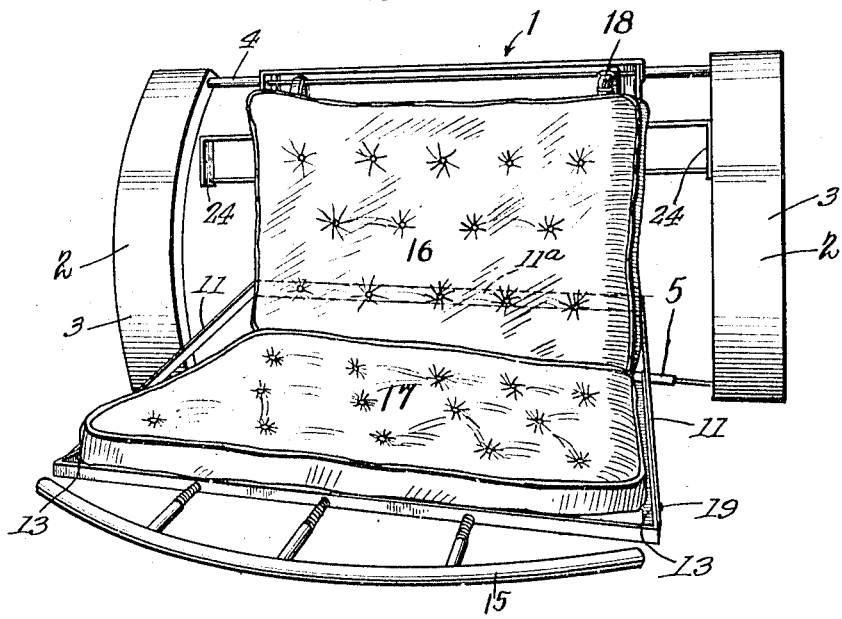
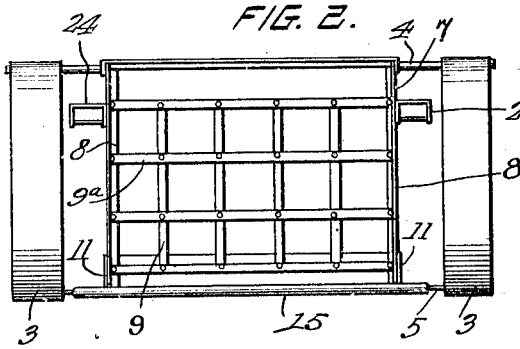
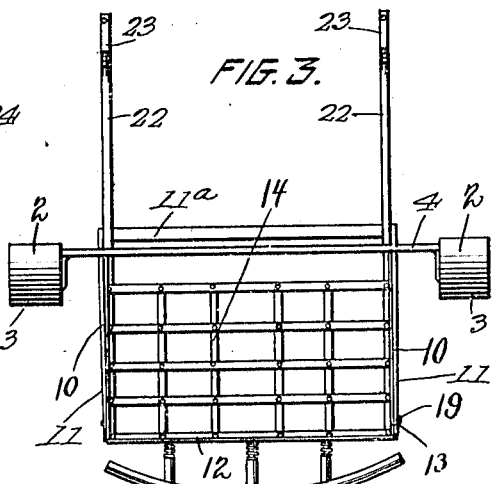
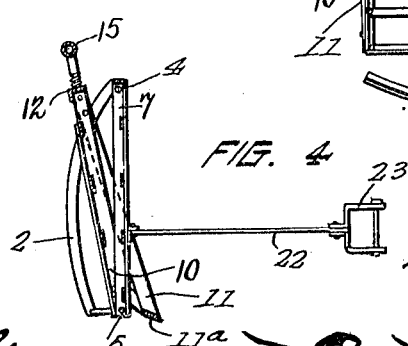
Inventor
Wm. Colvin
By Chas. C. Richardson
Attorney

UNITED STATES PATENT OFFICE.

WILLIAM COLVIN, OF CINCINNATI, OHIO.

COLLAPSIBLE AUTOMOBILE-FENDER.

1,241,709.

Specification of Letters Patent.

Patented Oct. 2, 1917.

Application filed July 29, 1916. Serial No. 112,048.

*To all whom it may concern:*

Be it known that I, WILLIAM COLVIN, a citizen of the United States, residing in Cincinnati, in the county of Hamilton and State of Ohio, have invented new and useful Improvements in Collapsible Automobile-Fenders, of which the following is a specification.

The present invention relates to new and useful improvements in fenders and in particular to that class designed especially for application to an automobile or other like vehicle.

The primary object of the above invention is the provision of a fender which can be quickly applied to or removed from an automobile or the like.

Another object of the invention is the provision of a fender which can be folded so that the lower extending portion thereof can be moved upwardly out of the way if desired.

Another object of the invention is the provision of a fender which is foldable and which supports removable cushions which can be attached or removed at will.

Another object of the invention is the provision of an automobile fender which will be comparatively simple and inexpensive to manufacture, reliable and efficient in use, and readily operated.

With the above and other objects in view, the present invention resides in the novel features of construction, formations, combinations and arrangements of parts to be hereinafter more fully described, claimed, and illustrated in the accompanying drawing, forming a part of this application, in which:

Figure 1 is a perspective view of the invention;

Fig. 2 is a front elevation thereof with the cushions removed;

Fig. 3 is a plan view thereof with the cushions removed;

Fig. 4 is a longitudinal sectional view thereof with the lower portion folded upwardly;

Fig. 5 is a detail perspective view illustrating the connection between the frames showing the manner in which the braces are folded either from left to right or right to left.

Referring to the accompanying drawing by corresponding characters of reference throughout the several views, the numeral 1 designates in general my improved fender which consists of a pair of side bars 2 arranged in substantially vertical relation and being bowed outwardly intermediate their ends as shown at 3 for the purpose of protecting the body of a person caught by the fender, from contact with the front wheels.

These bars 2 are connected at their upper ends by a horizontal rod 4 and at their lower ends by a similar rod 5.

A substantially vertical frame 7 consisting of outer side bars 8 and intermediate crossed bars 9 which are in turn secured to bars 9ª secured to bars 8, is secured to these rods 4 and 5 as clearly illustrated in Fig. 2. A lower frame 10 is journaled for swinging movement upon the rod 5 and is retained rigid in its lowered position by the braces 11 which connect the frame 7 with the frame 10. The frame 10 consists of side bars 13 and end bar 12 which are in turn connected by the intermediate crossed bars 14, while secured to the end bar 12 is a curved buffer 15 of ordinary construction.

Cushions 16 and 17 are secured to the frames 7 and 10 respectively by means of clips 18 or other suitable fastening devices.

The braces 11 are the branches of a U-shaped member secured as at 19 to the sides 13 of the frame 10 and constitute the branches of the U-shaped member, the back 11ª of which engages the rear of vertical frame 7 so that when the lower frame is raised, it will swing inwardly against the front of the frame 7 after the cushions 16 and 17 have been removed, with the braces 11 and connecting back 11ª occupying the position shown in Fig. 4.

The fender is supported by the rods 22 which extend rearwardly from the frame 7, which are pivotally connected therewith as shown in Fig. 5, for the purpose of folding in shipment, and have their inner ends equipped with suitable fastening clips 23 which can be secured to the axle of a vehicle (not shown). Clips 24 which may be secured to the side frame members of the vehicle, are attached to the end members 8 of the vertical frame.

Having thus fully described the invention what I claim as new and desire to protect by Letters Patent is:

In a collapsible fender for automobiles, the combination of a pair of side bars bowed intermediate their ends, rods connecting said side bars at their upper and lower ends thereof, an upper frame connected to said rods, a lower frame fulcrumed to the lower rod and movable upwardly against the outer side of the upper frame, braces pivotally connected to the upper frame and having detachable connection to said lower frame, said braces being foldable inwardly between said frames when the fender is collapsed, and removable cushions supported upon said frames.

Signed at Cincinnati, in the county of Hamilton, and State of Ohio, this 23 day of February, 1916.

WILLIAM COLVIN.

Copies of this patent may be obtained for five cents each, by addressing the "Commissioner of Patents, Washington, D. C."